June 17, 1969  R. MUNZING  3,450,272
COUPLING FOR VEHICLES OF TOY AND MODEL RAILROADS WITH A
DEVICE FOR PREDISENGAGEMENT OF THE COUPLING
Filed June 12, 1967
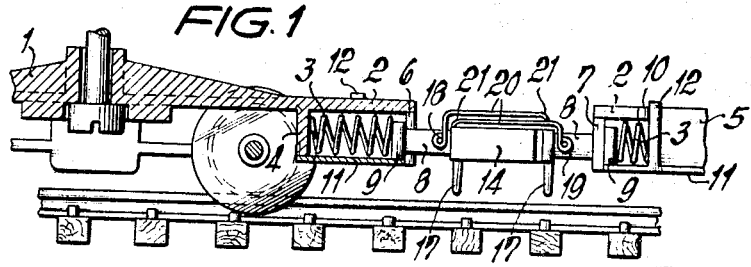
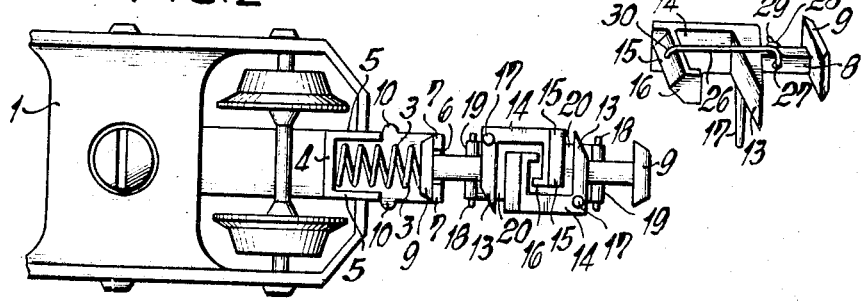
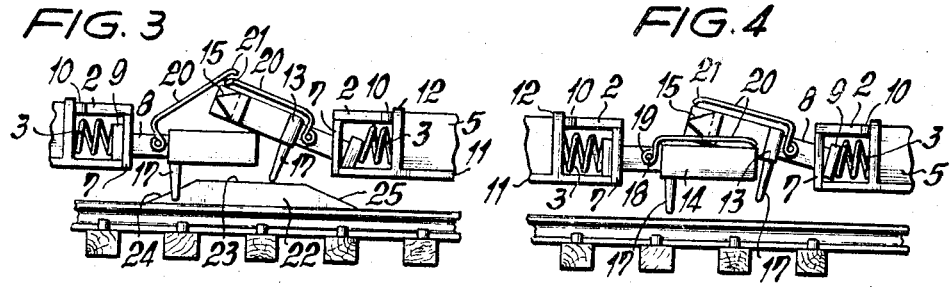
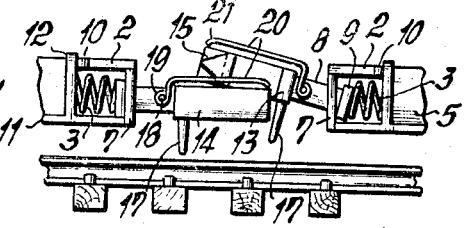
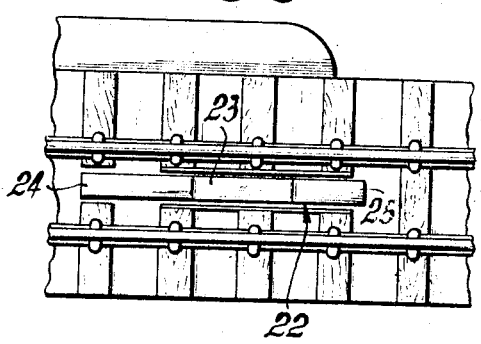
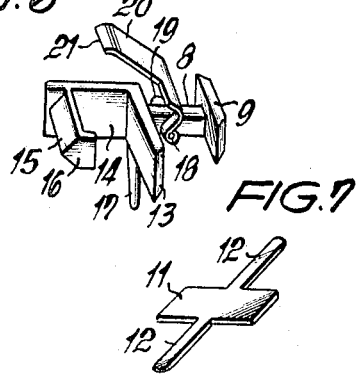
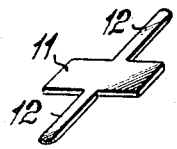

United States Patent Office 3,450,272
Patented June 17, 1969

3,450,272
COUPLING FOR VEHICLES OF TOY AND MODEL RAILROADS WITH A DEVICE FOR PREDISENGAGEMENT OF THE COUPLING
Robert Munzing, Nuremberg, Germany, assignor to Max Ernst, Nuremberg, Germany
Filed June 12, 1967, Ser. No. 645,189
Claims priority, application Germany, June 20, 1966, E 31,892
Int. Cl. A63h 19/18
U.S. Cl. 213—75
6 Claims

ABSTRACT OF THE DISCLOSURE

Model rail vehicle coupling wherein coupling members on adjacent vehicles will cam together into coupling engagement when pushed together and can be disengaged by lifting one thereof in which a cover member on each coupling member will lift to ineffective position during a normal coupling operation whereas if the couplings are presented to each other with one elevated to uncoupling position, the cover member on the unlifted coupling member will prevent coupling together of the coupling members.

---

The present invention relates to a coupling for vehicles of toy and model railroads with a device for pre-disengagement of the coupling. For small gauges, a coupling for vehicles of toy and model railroads has become known which has identical coupling sections, and in which each coupling section consists primarily of a horizontally extending coupling hook. The outer end of said coupling hook is provided with a coupling nose extending transverse to the driving direction and having a triangular cross section. The said coupling nose has an inner vertical confining surface and an outwardly located edge. The coupling hook is furthermore provided with a downwardly extending de-coupling stud laterally offset with regard to the vertical plane of symmetry of the vehicle. Said de-coupling stud is for purposes of mounting the same provided with a T-shaped extension comprising a shank and a flange. Said extension is, by means of a pressure spring acting upon the flange, adapted to tilt from its intermediate position to both sides and is furthermore adapted for purposes of coupling and uncoupling to be tilted upwardly and downwardly while being mounted on the vehicle.

By means of an uncoupling board or plank arranged eccentrically with regard to the vertical plane of symmetry of the vehicles and between the rails, or by upward tilting of one of the two coupling hooks, the vehicles coupled together can be uncoupled. When two vehicles move toward each other, the coupling noses of the two coupling hooks hit each other so as to carry out a vertical tilting movement, whereby the two vehicles are automatically coupled.

During normal operation, frequently the requirement is to be met that the uncoupled vehicles are not to be coupled to each other when they first move toward each other. This is the case, for instance, when by means of a switching locomotive a number of vehicles are, through the intervention of different switches, to be moved to a plurality of siding tracks. In this instance, the coupling sections of two vehicles, one behind the other, are to be brought into the condition of the so-called pre-uncoupling in which condition it is possible that the pulling vehicle can detach itself from the pushed vehicle.

The above described coupling, which is particularly well suitable for small gauges such as 9 mm., makes it possible by relatively simple means to carry out such pre-uncoupling to which end it is merely necessary between the tracks to provide an eccentrically located uncoupling plank or board which can be folded upwardly.

The present invention concerns a coupling of the above described type with an additional device for carrying out a preuncoupling operation. This has been realized, according to the present invention, to provide the top side of the coupling hook with a flat cover body which has its rear end, which faces the mounting of the hook, tiltably journalled on the shank of the coupling hook, and the front end of which faces the coupling nose ends approximately above the edge of the coupling nose.

A particularly safe pre-coupling operation can be realized when that portion of the flat cover body which is located above the edge of the coupling nose is somewhat downwardly inclined.

The flat cover body may comprise a plate, the front end of which is curved downwardly, or may comprise a bar or wire extending in the driving direction. When the flat cover body comprises a plate, the latter has, within the range of the longitudinal web of the oppositely located coupling section, to be provided with a recess. When employing a rod or wire-shaped cover body, the rear end thereof may in a suitable manner be angled off and can serve directly as bearing stud for journalling in a bore of the shank of the coupling hook.

The invention is illustrated by way of example in the accompanying drawing, in which:

FIG. 1 illustrates in a side view, partially in section, of a coupling according to the invention provided with an upwardly tilted plate each on the coupling sections.

FIG. 2 is the bottom view of the coupling illustrated in FIG. 1.

FIG. 3 is a side view of the coupling illustrated in FIGS. 1 and 2, with the upwardly moved uncoupling body in the phase of effecting an uncoupling operation.

FIG. 4 shows the same coupling as FIGS. 1, 2, 3 in preuncoupled condition.

FIG. 5 represents a track section with the uncoupling bodies seen from the top.

FIG. 6 is a perspective view of a coupling section with the tiltable plate tilted upwardly.

FIG. 7 is a stamping form closing the bearing for the coupling hook.

FIG. 8 is a modification of the invention with a wire member tilted upwardly and resting on the coupling hook.

Referring now to the drawing in detail, the coupling shown therein is to be intended to be provided on one end each of two axle trucks. However, if desired, the coupling may in the same manner be mounted directly at the ends of the vehicle. For purposes of mounting the coupling hook, the truck 1 has that end thereof which faces the end of the car provided with a box-shaped extension 2, which is open at the bottom and in which is inserted a helical coil 3. The rear portion of extension 2 is confined toward the rear by a plane wall 4, and at both sides is confined by plane wall portions 5. The front portion of extension 2 has laterally no confining surfaces and toward the front, is confined by a wall 7 which in its central portion, is provided with a vertical slot 6. The slot 6 receives from below the hook end which consists of a shank 8 of rectangular cross section, and a flange 9, so that flange 9 is by means of spring 3 pressed against the wall 7. The top side of the extension 2, approximately in the central portion thereof is on the right and left-hand side provided with an ear 10 each. By means of a stamping illustrated in the FIG. 7, and consisting in a plate 11 with two lateral arms 12, following the insertion of spring 3 and of the T-shaped extension 8, 9 into the recess of extension 2, the recess is closed from below while the arms 12 are placed around the extension 2 behind the ears 10.

The coupling hook itself comprises a transverse web 13 adjacent shank 8, a longitudinal web 14 at a right angle to said transverse web 13, and a coupling nose 15 at a right angle to the longitudinal web 14. The coupling nose 15 is followed by a relatively short confining web 16 at the rear side of the coupling nose 15. Each coupling hook is provided with a downwardly extending uncoupling stud 17 which is arranged non-symmetrically with regard to the central longitudinal plane of the vehicle and is connected to the transverse web 13.

For purposes of carrying out a pre-coupling operation, the embodiment of FIGS. 1 to 6 additionally comprise the following devices. Directly behind the transverse web 13 of the coupling hook, there is in the shank 8 of the extension 8, 9, provided a short stud 18 having pivotally connected thereto a plate 20 provided with two eyes 19. This plate 20 may be made of sheet metal or any other suitable material as for instance, colored or transparent synthetic material. Plate 20 will ordinarily, due to its weight, rest on the top side of the hook. Its length is so selected that it ends approximately in the vertical plane through the edge of the coupling nose 15. The front end 21 is slightly downwardly inclined toward the coupling nose. Within the range of the longitudinal web 14 of the counter-coupling section, each plate 20 is provided with a recess (FIG. 6). Between the rails of the track and more specifically non-symmetrically with regard to the central longitudinal plane of the track, there is provided an uncoupling body 22 which is equipped with a surface 23 that is level in upwardly tilted condition of said body 22. The surfaces 23 are continued toward both sides by upwardly inclined surfaces 24, 25. The uncoupling body 22 should normally be so located between the rails that it will not be contacted by the uncoupling stud 17. When the uncoupling or disengaging body 22 is manually or by means of electromagnets tilted upwardly, it is supposed to occupy the position shown in FIG. 3.

*Operation*

The device for pre-disengaging or uncoupling operates as follows. The plate 20 resting on each coupling hook does not impede in any way the normal coupling and uncoupling operation. This means that when two vehicles equipped with a coupling of the type involved move toward each other, one of the two coupling sections will with the plate 20 resting thereon be tilted upwardly while the two coupling hooks and the two plates will occupy the position shown in FIGS. 1 and 2. By upwardly tilting one of the two coupling hooks, for instance through the intervention of the uncoupling board or plate, by means of the uncoupling stud 17 a disengagement of the two couplings will be possible.

When a pre-uncoupling operation is to be carried out, an unloading body is required as it is illustrated in FIGS. 3 and 5 which has a surface 23 located within the range of the uncoupling stud 17 and extending approximately horizontally while being provided with adjacent downwardly directed inclined surfaces 24 and 25. It may now be assumed that two vehicles coupled to each other will in conformity with FIG. 3 pass the uncoupling plate 22 from the left to the right. In this instance the uncoupling stud 17 of the right-hand pulling vehicle passes over the inclined surface 23 so that the coupling hook occupies the uncoupling position shown in FIG. 3. The unloading stud 17 of the left hand pulled vehicle will be located adjacent the uncoupling board 22 so that this coupling section retains its untilted position. The lefthand vehicle will thus be uncoupled or disengaged, and when the right-hand vehicle continues its movement, the plate 20 of the left-hand vehicle will be placed upon the coupling hook. If now the right-hand vehicle moves back again, the coupling hook will again be lifted over the inclined surface 25. Its uncoupling stud again moves onto the straight surface 23. The plate 20 of the left-hand vehicle will not be lifted again in view of the inclined position of the right-hand coupling hook and also in view of the slight downward curvature of the end 21 of the left-hand plate 20. When both vehicles move toward the left, the two coupling sections will therefore occupy the position shown in FIG. 4 according to which the coupling hook of the right-hand vehicle will be located over plate 20 of the coupling section of the left-hand vehicle. In this position of the coupling, a re-engagement of both coupling sections is not possible. Such re-engagement can be effected only when the right-hand vehicle has moved away from the left-hand vehicle to such an extent that both coupling sections again occupy their normal position. If now a movement of both vehicles toward each other is effected, a re-engagement or coupling will occur.

The operation of the device is precisely the same when the plate 20 of the right-hand coupling section during a coupling operation is located over plate 20 of the left-hand coupling section which position may occur as often as the reverse position. In this instance, during the uncoupling operation, both plates 20 are tilted upwardly.

*Modification of FIGURE 8*

With the embodiment illustrated in FIG. 8, the pre-uncoupling cover body on the coupling hooks consists of one wire member 26 each which is angled off a plurality of times at its rear end so that a horizontally extended bearing stud 29 is formed which extends into a bore 27 in shank 28 of the coupling hook and is secured in its position by a cotter disc 28 or the like. The front end 30 of the wire member 26 is slightly bent downwardly and ends above the edge of the coupling web. The operation of this wire member 26 is approximately the same as that of plate 20.

As will be seen, each coupling member has a triangular nose so that when two coupling members are pushed together endwise, one will ride up over the end of the other and drop into coupling position. As the one coupling member rides up, it will engage and lift the cover member of the other coupling member so the cover member does not interfere with normal coupling operations. Similarly, the cover members do not interfere with normal uncoupling operations.

When a disengaged coupling is elevated to uncoupling height, however, the couplings can be brought together and the cover member of the unlifted coupling will be interposed between the coupling members and will prevent coupling together thereof after the lifting force is removed from the lifted coupling members.

The cover member, when in the form of a plate, is notched on the side that is adjacent web 14 of an adjacent coupling member so the web will not strike the cover member during a coupling operation.

What is claimed is:

1. Coupling means for toy and model rail vehicles comprising: a coupling member on the end of a vehicle, said coupling member being C-shaped when viewed from the top so that an identical coupling member on the adjacent end of another vehicle can be engaged therewith, said coupling member being tiltable on said vehicle about an axis extending transversely of the vehicle and near the vehicle end of the coupling member, said coupling member having its outer end provided with a cam surface so that when it is pushed together with another coupling member the coupling members will cam into coupled engagement, an uncoupling pin dependent from the coupling member to one side of the central plane of the coupling member and vehicle engageable by an uncoupling member disposed in the rail bed for the vehicle, said uncoupling member when effective lifting the coupling member to uncoupled position to permit separation thereof from another coupling member which it engages and which is not lifted by said uncoupling member, a pre-coupling cover member resting on top of said coupling member and tiltable upwardly at the outer end of the coupling member and having its outer end positioned near the outer end of the coupling member so that when two coupling members cam into actual coupling engagement the one of the coupling members which rides up over the outer end of the other will tilt the pre-coupling cover member on the other coupling member upwardly so the pre-coupling cover member will not interfere with the actual coupling operation whereas if one of said coupling members is in elevated position when the coupling members are brought together endwise the said pre-coupling cover member on the unlifted coupling member will be disposed beneath the elevated coupling member and will prevent the elevated coupling member from dropping into actual coupling position.

2. A coupling means according to claim 1 in which said cam surface is a triangular nose with upwardly and downwardly inclined portions and the outer end of said precoupling cover member is inclined downwardly in a complementary relation with only the upwardly inclined portion of said triangular nose.

3. A coupling means according to claim 1, in which said cam surface includes upwardly and downwardly inclined portions and said pre-coupling cover member is in the form of a plate pivoted to the coupling member near the vehicle end thereof and bent down at its outer end in a complementary relation to only said upwardly inclined portion of said cam surface.

4. A coupling means according to claim 3 in which each said plate has a longitudinal notch extending therein from the outer end on the side toward which the coupling member opens.

5. A coupling means according to claim 1, in which said cam surface includes upwardly and downwardly inclined portions and said pre-coupling cover member is in the form of a wire pivoted to the coupling member near the vehicle end thereof and extending over the top of the coupling member and bent down at its outer end in a complementary relation to only said upwardly inclined portion of said cam surface.

6. A coupling means according to claim 5, in which said wire is formed at its end toward the vehicle to form bearing means, and journalling means on the coupling member pivotally engaging said bearing means for tiltably supporting said wire therein for tiltable movements in a vertical plane.

References Cited

UNITED STATES PATENTS

| | | | |
|---|---|---|---|
| 1,750,314 | 3/1930 | Forchheimer | 213—75 X |
| 2,157,364 | 5/1939 | Van Dorn | 213—1.3 |
| 3,338,429 | 8/1967 | Zetzsche | 213—75 |

DRAYTON E. HOFFMAN, *Primary Examiner.*

U.S. Cl. X.R.

46—218